United States Patent [19]

Kamada et al.

[11] 4,158,726
[45] Jun. 19, 1979

[54] PROCESS FOR PREPARING BEAD POLYMERS

[75] Inventors: Osamu Kamada; Kenzoh Watanabe, both of Sagamihara; Shigeru Sawayama, Machida, all of Japan

[73] Assignees: Mitsubishi Chemical Industries Ltd.; Kyoritsu Yuki Co., Ltd., both of Tokyo, Japan

[21] Appl. No.: 864,871

[22] Filed: Dec. 27, 1977

[30] Foreign Application Priority Data

Jan. 5, 1977 [JP] Japan .................................... 52/289

[51] Int. Cl.² ............................ C08F 2/08; C08F 2/20; C08F 120/00; C08F 222/00
[52] U.S. Cl. ..................................... 526/200; 526/71; 526/206; 526/207; 526/219; 526/287; 526/292; 526/909; 526/910; 526/923
[58] Field of Search ................ 526/200, 71, 292, 909, 526/910, 206, 923; 260/79.3 M

[56] References Cited

U.S. PATENT DOCUMENTS

| | | | |
|---|---|---|---|
| 2,572,560 | 10/1951 | Ham | 526/292 |
| 3,211,708 | 10/1965 | Zimmermann et al. | 526/206 |
| 3,278,506 | 10/1966 | Chamot et al. | 526/206 |
| 3,719,651 | 3/1973 | Greminger et al. | 526/200 |
| 3,806,478 | 4/1974 | Mansour et al. | 526/200 |
| 3,975,341 | 8/1976 | Trapasso | 526/88 |
| 4,037,040 | 7/1977 | Trapasso et al. | 526/909 |
| 4,060,678 | 11/1977 | Steckler | 526/292 |

FOREIGN PATENT DOCUMENTS

| | | | |
|---|---|---|---|
| 1110869 | 7/1961 | Fed. Rep. of Germany | 526/200 |
| 2064101 | 7/1972 | Fed. Rep. of Germany | 526/71 |
| 42-9656 | 5/1967 | Japan. | |
| 47-304 | 6/1972 | Japan. | |

*Primary Examiner*—Herbert J. Lilling
*Attorney, Agent, or Firm*—Lane, Aitken & Ziems

[57] ABSTRACT

Disclosed is a process for preparing a water-soluble bead polymer by dispersing drops of an aqueous solution of water-soluble vinyl monomer in a dispersing medium in the presence of a dispersion stabilizer, and polymerizing the monomer by using monomer selected from the following A and B (A) a compound of the general formula I

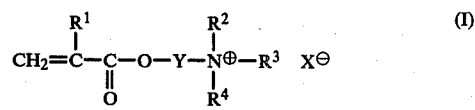

wherein $R^1$ is hydrogen or methyl, $R^2$ and $R^3$ may be the same or different and each is linear or branched alkyl of from 1 to 4 carbon atoms, $R^4$ is hydrogen, linear or branched alkyl of from 1 to 8 carbon atoms, hydroxy alkyl of from 1 to 4 carbon atoms, or benzyl, Y is alkylene or hydroxyalkylene each of from 2 to 4 carbon atoms, and $X^-$ is an anion, or (B) a mixture of the compound of the formula I and a water-soluble vinyl monomer copolymerizable with the compound (I), and a cellulose ester or a cellulose ether insoluble in water but soluble in the dispersing medium is used as the dispersion stabilizer.

18 Claims, No Drawings

PROCESS FOR PREPARING BEAD POLYMERS

BACKGROUND OF THE INVENTION

1. Field of the Invention

The present invention relates to an improved process for preparing a water-soluble cationic bead polymer having an excellent water-solubility.

2. Description of Prior Art

Water-soluble high molecular weight polymers which are obtained by polymerising monomers such as neutralized salts or quaternary compounds of dialkylaminoalkyl (meth)acrylates have important applications, for example, as flocculating agents, soil conditioners, drainages, retention aids, sizing agents and treatment of fibers.

Recently, such polymers have been used in large amount as dehydration accelerators for surplus sludges formed in activated sewage treatment systems in feces and sewage treatment plants and chemical and food processing plants and have taken an important place among waste water treating agents.

If a water-soluble cationic polymer is used as a flocculating agent, the higher its molecular weight, the greater its effectiveness. In a method wherein a monomer such as a neutralized salt or a quarternary ammonium salt of a dialkylaminoalkyl (meth)acrylate is polymerized to produce a water-soluble polymer, it is possible to employ methods in which water-soluble polymers, for example, polyacrylamide are prepared by the usual radical mechanism as in aqueous solution polymerizations, precipitation polymerization and suspension polymerizations.

In order to obtain high molecular weight polymers in the aqueous solution polymerization, the polymerization is carried out in a monomer concentration of 10% by weight or higher and thus the products which are gummeous and contain water are formed. Since such polymers take a long time for dissolution and are also difficult to transport, they must be powdered by grinding and drying. Also, in this method the molecular weight is reduced considerably due to the difficulty of stirring the reaction mixture during polymerization for the removal of the reaction heat, resulting in non-uniform products.

Although according to the precipitation polymerization uniform and powdery polymers are easily obtained, a solvent having high polarity and being capable of dissolving neutralized salts and quarternary ammonium salts of dialkylaminoalkyl (meth)acrylates should be selected. In this case, it is difficult to obtain polymers of high molecular weight due to a significant chain transfer action of solvent during polymerization and the products obtained tend to be finely divided powders.

On the other hand, the suspension polymerization is an advantageous polymerization method for easily obtaining high molecular weight polymers in the form of powder due to a great capacity for removal of reaction heat. According to a conventional method, for example, as disclosed in British Pat. No. 841,127 or U.S. Pat. No. 3,211,708, an aqueous solution of monomer is polymerized in an inert dispersing medium using a nonionic emulsifier in the form of water-in-oil or oil-in-water type emulsion.

When this method is applied to the polymerization of monomers comprising neutralized salts and quarternary ammonium salts of dialkylaminoalkyl (meth)acrylates, it is difficult to form emulsions owing to the salting-out effect of these salts. Even if the emulsions are formed under appropriate conditions, for example, by using a very low concentration of the aqueous monomer solution, there will be a tendency to form polymers in the form of very fine powder after polymerizing and drying. These very finely powdered water-soluble polymers exhibit a very slow rate of dissolving since they bring in air bubbles upon dissolving in water. Moreover, these polymers are scattered into dust during the dissolving operation and the working atmosphere becomes polluted. In order to obtain products which are not in the form of very fine powder by the suspension polymerization, an aqueous solution of monomer should be polymerized in the state of drop dispersion by using a suitable dispersion stabilizer but not by forming an emulsion with an emulsifier.

A method for polymerizing an aqueous solution of water-soluble vinyl monomer by suspending it as droplets is disclosed in Japanese Patent Publication No. 9,656/1967. According to the method, the polymerization is carried out in a dispersing medium based on a halogenated olefin in which an oleophilic cellulose derivative is dissolved and it is necessary to adjust the specific gravity of the dispersing medium so that it is equal to or more or less higher than the specific gravity of the aqueous monomer solution by admixing a hydrocarbon. There are found in this Publication examples of polymerization in which from 30 to 40% by weight aqueous solutions of sodium acrylate and sodium acrylate-acrylamide, sodium methyacrylate-methacrylamide and sodium acrylate-vinyl pyrrolidone mixtures are used. It is impossible to polymerize these monomers at a higher concentration due to the limitation of their solubility in water. Accordingly, although the products obtained are water-containing spherical gelatinous substances free from fine polymers, it is difficult to convert them into a solid product by an industrial process.

One known method using a cellulose derivative as a dispersion stabilizer, is disclosed in Japanese Patent Publication No. 47,304/1972, wherein the polymerization is carried out by suspending in an aliphatic or aromatic nonpolar solvent a water-soluble cellulose compound, which is insoluble in the dispersing medium, and adding an aqueous solution of vinyl monomer to the suspension. This method has, however, a tendency to give very finely powdered products.

SUMMARY OF THE INVENTION

It is an object of the present invention to provide an improved method for polymerizing monomers including neutralized salts and quarternary ammonium salts of dialkylaminoalkyl (meth)acrylate to form water-soluble polymers wherein the method has the characteristics of suspension polymerization and gives products in a preferred form, eliminating the problems described hereinbefore. We have found that it is possible ot polymerize the above monomers at any concentration in aqueous solution, especially, using a highly concentrated aqueous solution of the monomers, if a specific dispersion stabilizer is used in combination with or without a specific suspending medium. We have also found that, by means of such method, very high-molecular weight polymers of excellent solubility are obtained in the form of beads which are of a uniform particle size and are free from very fine powder.

Accordingly, the present invention is a process for preparing a water-soluble bead polymer by dispersing dropwise an aqueous solution of a water-soluble vinyl monomer in a dispersing medium and polymerizing the monomer in the presence of a dispersion stabilizer, characterized in that (A) a compound of the general formula I

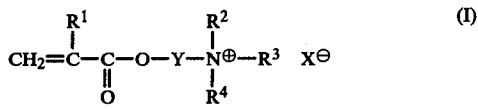

wherein $R^1$ is hydrogen or methyl, $R^2$ and $R^3$ may be the same or different and each is linear or branched alkyl of from 1 to 4 carbon atoms, $R^4$ is hydrogen or linear or branched alkyl of from 1 to 8 carbon atoms, hydroxyl alkyl of from 1 to 4 carbon atoms or benzyl, Y is alkylene or hydroxyl alkylene each of from 2 to 4 carbon atoms, and $X^-$ is anion, or (B) a mixture of the compound of the formula I and a water-soluble vinyl monomer copolymerizable with the compound (I) is used as the water-soluble vinyl monomer, and a cellulose ester or cellulose ether insoluble in water but soluble in the dispersing medium is used as the dispersion stabilizer.

The above and other objects and preferred embodiments of the present invention will become more apparent from the following detailed description.

DETAILED DESCRIPTION OF THE INVENTION

The monomers of the formula I include salts of dialkylaminoalkyl acrylates or dialkylaminoalkyl methacrylates of the general formula II

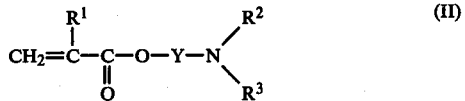

wherein $R^1$, $R^2$, $R^3$ and Y have the same meanings as in the formula I, with inorganic acids, carboxylic acids and sulfonic acids. These salts are referred to herein as neutralized salts.

Examples of the compounds of the formula II are specifically dimethylaminoethyl acrylate, dimethylaminoethyl methacrylate, diethylaminoethyl acrylate, diethylaminoethyl methacrylate, dibutylaminoethyl acrylate, dibutylaminoethyl methacrylate, methylethylaminoethyl acrylate and dimethylamino-2-hydroxypropyl methacrylate. The inorganic acids are, for example, hydrochloric acid, sulfuric acid, nitric acid and phosphoric acid; the carboxylic acids are, for example, acetic acid and propionic acid; and the sulfonic acids are for example, benzene sulfonic acid and tosyl acid or toluene sulfonic acid.

The compounds of the formula I also include quarternary ammonium salts which are obtained by reacting the acrylates and methacrylates of the formula II, with quaternizing agents such as alkyl halides, aralkyl halides and dialkyl sulfates. Examples of the quarternary ammonium compounds are β-methacryloyloxyethyl trimethyl ammonium chloride, β-methacryloyloxyethyl trimethyl ammonium methyl sulfate, β-methacryloyloxyethyl dimethyl-ethyl ammonium bromide, β-methacryloyloxyethyl dimethyl-ethyl ammonium monoethyl sulfate, β-methacryloyloxyethyl dimethylbenzyl ammonium chloride, β-acryloyloxyethyl trimethyl ammonium chloride, β-acryloyloxyethyl triethyl ammonium bromide and 2-hydroxy-3-methacryloyloxypropyl trimethyl ammonium chloride.

According to the present invention, water-soluble high-molecular weight cationic polymers are produced, which include homopolymers of the compounds of the formula I as well as copolymers of (A) a compound (I) contained in the amount of at least 5 mole % and (B) another water-soluble vinyl monomer copolymerizable with the compound (I). For example, acrylamide and methacrylamide are used as the water-soluble vinyl monomer copolymerizable with the compound (I).

Cellulose esters or cellulose ethers used as the dispersion stabilizer are, for example, water-insoluble ones such as cellulose acetate, cellulose propionate, cellulose butylate, cellulose acetate butylate, cellulose acetate phthalate, ethyl cellulose, ethyl hydroxyethyl cellulose and benzyl cellulose, and it is preferred to use cellulose acetate butylate, ethyl cellulose and ethyl hydroxyethyl cellulose. As the dispersing medium, organic liquids are used that are substantially non-compatible with the aqueous monomer solutions used and are inert under the polymerization conditions.

The water-insoluble cellulose esters and ethers exhibit different properties in a variety of solvents, for example, as follows:

(1) Soluble, solution clear of haze and free from gels.
(2) Soluble, solution hazy and free from gels.
(3) Soluble, solution of granular nature due to present of gels.
(4) Completely gelatinized.
(5) Swollen, or incompletely gelatinized.
(6) Insoluble not swollen.

Compounds having the properties of from (1) to (3) dissolve the cellulose esters or ethers, and compounds having the properties of from (4) to (6) do not dissolve cellulose ester or ethers. In order to attain a good dispersion stability, it is preferred to use as the dispersing medium compounds having the property (3) or compounds which have properties of (4) and (5) at room temperature but which can dissolve the cellulose esters or ethers at an elevated temperature at which the polymerization is carried out. However, it is in general not easy to find a combination of dispersing medium and dispersion stabilizer exhibiting the above preferred properties. Thus a condition under which the dispersion is generally of good stability may be advantageously obtained in such a manner that a compound capable of gelatinizing or swelling the dispersion stabilizer, the compound (4) or (5) is added gradually to a solution in which the dispersion stabilizer is dissolved, a limit point at which the dispersion stabilizer is insolubilized is determined and a mixture of compounds of a mixing ratio close to the above limit point is used as the dispersing medium. If the compound (6) is added to the compound (1), (2) or (3), the stability of the dispersion is remarkably decreased.

Water-insoluble cellulose esters and ethers ae influenced in their solubility properties to a great extent by their substituents and degrees of substitution of anhydrous glucose unit. They are roughly divided into solubility categories as follows:

(i) soluble in polar compounds such as esters, ketones, alkyl halides, nitroalkanes, alcohols and ethers but insoluble in compounds such as aromatic hydrocarbons and halogenated aromatic hydrocarbons.

(ii) soluble in polar compounds as mentioned in (i) aromatic hydrocarbons and halogenated aromatic hydrocarbons but insoluble in cycloaliphatic hydrocarbons.

(iii) soluble also in cycloaliphatic hydrocarbons but insoluble in aliphatic hydrocarbons.

[I]. Firstly, cellulose esters and ethers having the properties of (i) will be discussed. These cellulose esters and ethers include, for example cellulose acetate, cellulose acetate butylate, ethyl cellulose containing from 43 to 46% by weight of ethoxy groups and cellulose acetate phthalate. As solvents which gelatinize or swell these cellulose derivatives, it is preferable to use aromatic hydrocarbons and halogenated aromatic hydrocarbons. Also the following esters, ketones and alkyl halides are preferably used as compounds dissolving these cellulose derivatives:

Suitable esters include esters of aliphatic carboxylic acids of from 7 to 8 carbon atoms or aromatic carboxylic acids of from 7 to 8 carbon atoms with alkanol or alkoxy alkanol, each alkanol of from 1 to 8 carbon atoms. These esters include, for example, methyl acetate, ethyl acetate, n-propyl acetate, isopropyl acetate, n-butyl acetate, isobutyl acetate, t-butyl acetate, phenyl acetate, benzyl acetate, methoxyethyl acetate, butoxyethyl acetate, methyl propionate, ethyl propionate, methyl butyrate, butyl butyrate, methyl valerate, methyl caproate, methyl caprylate, methyl benzoate, ethyl benzoate, n-butyl benzoate, dimethyl phthalate, diethyl phthalate and dibutyl phthalate. Esters of aliphatic carboxylic acids with alkanol or alkoxyl alkanol are preferable amongst the above esters.

Suitable ketones include aliphatic ketones of from 3 to 10 total carbon atoms or aromatic ketones of from 8 to 13 total carbon atoms. For example, these ketones include acetone, methyl ethyl ketone (MEK), methyl n-propyl ketone, diethyl ketone, cyclopentanone, methyl butyl ketone, methyl isobutyl ketone (MIBK), cyclohexanone, methyl amyl ketone, dipropyl ketone, hexyl methyl ketone, acetophenone and benzophenone.

Alkyl halides include alkyl halides of from 1 to 6 carbon atoms, preferably of from 2 to 4 carbon atoms. Especially preferred alkyl halides are those which have from 2 to 4 carbon atoms and each of adjacent two carbon atoms are substituted by at least one halogen. Examples of these alkyl halides are 1,2-dichloroethane, 1,1,2-trichloroethane, 1,1,2,2-tetrachloroethane, pentachloroethane, 1,2-dichloropropane, 1,2-dibromethane, 1,1,2-tribromoethane, 1,2-dibromopropane and 1,2-dibromobutane.

Other alkyl halides such as methylene chloride, chloroform and carbon tetrachloride may not be used in some cases as a dispersing medium for the suspension polymerization since they have lower boiling points and further may dissolve the monomers of the formula I. Also, alkyl halides which are substituted at only one of two adjacent carbon atoms by halogen may require certain measures for preventing lumping, for example, by increasing the rate of polymerization since these alkyl halides may dissolve only low-molecular weight cellulose esters and ethers and therefore the dispersion stability during polymerization may be reduced.

As compounds which do not dissolve the dispersion stabilizers and may be added to the above compounds which do dissolve the stabilizers for the purpose of improving the dispersion stability, solvents which gelatinize as well as swell the stabilizers may be used, but aromatic hydrocarbons and halogenated aromatic hydrocarbons each of from 6 to 8 carbon atoms are especially preferred, for example, benzene, toluene, xylene, ethylbenzene, monochlorobenzene, dichlorobenzene, monobromobenzene and dibromobenzene. The aromatic hydrocarbons or halogenated aromatic hydrocarbons to be added to the compounds dissolving the dispersion stabilizers are advantageously used in an amount up to an uppermost limit at which the stabilizers are not insolubilized. In order to attain the optimum conditions of dispersion, a ratio, by weight, of the compounds dissolving the dispersion stabilizers to the aromatic hydrocarbons or halogenated aromatic hydrocarbons may concretely be defined within the following range:

$$n > \chi \geqq \tfrac{1}{8} n, \text{ preferably } n > \chi \geqq \tfrac{1}{2} n$$

wherein $\chi$ stands for a ratio, by weight, of the aromatic hydrocarbons or halogenated aromatic hydrocarbons to the compounds which easily dissolve the dispersion stabilizers and n stands for a value of $\chi$ at a point in time when the stabilizers start to become insolubilized. In this case, insolubilization means the state where the dispersion stabilizers can be observed with the naked eye to become insoluble. If $\chi$ is equal to or larger than n, the dispersion stabilizers will not be solubilized, on the other hand, if $\chi$ is less than $\tfrac{1}{8}$ n, the dispersion stability will be insufficient. Cellulose acetate butyrate is the most preferred among the cellulose derivatives having the properties of (i). It is necessary to use the alkyl halide in excess to aromatic hydrocarbons. So it is preferable to use esters or ketones.

[II]. Next, cellulose esters and ethers having the properties of (ii) will be discussed. These cellulose derivatives include ethyl cellulose which contains of from 47 to 50% by weight of ethoxyl groups. Although such ethyl celluloses containing of from 47 to 50% by weight of ethoxyl groups are insoluble in cycloaliphatic hydrocarbons at room temperature, they are soluble in the latter under a heated condition to give a dispersion system of good stability. For example, the polymerization may be carried out at a temperature of 55° C. or higher using the ethyl cellulose in a well dispersed state in the aqueous monomer solution.

If such ethyl cellulose is used, the compounds dissolving the cellulose derivatives may suitable be combined for the purpose of lowering the temperature at which a good dispersion stability is obtained rather than for the purpose of improving the dispersion stability. Examples for these compounds dissolving the ethyl cellulose are aromatic hydrocarbons, halogenated hydrocarbons, esters, ketones, alkyl halides, ethers and alcohols. Cyloaliphatic hydrocarbons to be used as the dispersing medium in this case include cycloaliphatic or alkyl-substituted cycloaliphatic hydrocarbons each of from 5 to 10 carbon atoms, for example, cyclopentane, cyclohexane, cycloheptane, methyl cyclohexane, cyclooctane and decalin.

Although it is also possible to use a single dispersing medium from the above aromatic or halogenated aromatic hydrocarbons each of from 6 to 8 carbon atoms, it is necessary in this case to increase the rate of polymerizaton for obtaining the bead polymer of uniform particle size since the dispersion stability is somewhat insufficient. If the cycloaliphatic hydrocarbons are used in combination with the aromatic or halogenated aromatic hydrocarbons, it may be advantageous to add the latter in an amount of up to 4 times, and preferably, up to 2 times, based on the former.

If a mixture of the cycloaliphatic hydrocarbon and esters, ketones or alkyl halides is used, the latter may advantageously be added in an amount of up to 2 times, and preferably up to 1.5 time, based on the former. In this case, besides the alkyl halides which dissolve such as cellulose acetate butyrate as described in the above I, for example, methylene chloride and carbon tetrachloride may also be used.

Moreover, if the cycloaliphatic hydrocarbons are mixed with ethers or alcohol, the latter may advantageously be used in an amount of up to 0.3 times, preferably up to 0.2 times.

Ethers which may be mixed with the cycloaliphatic hydrocarbons include linear and cyclic ethers each of from 4 to 8 total carbon atoms, for example, di-n-propyl ether, di-n-butyl ether, tetrahydrofurane, dioxane, diethylene glycol dimethyl ether.

Alcohols which may be mixed with the cycloaliphatic hydrocarbons include alkanol and alkoxy alkanol each of from 2 to 8 total carbon atoms, for example, ethanol, n-propanol, n-butanol, n-octanol, methoxyethanol, ethoxy-ethanol, butoxy ethanol and diethylene glycol monomethyl ether.

Other compounds than those described above are not suited for solvents for the ethyl cellulose.

[III]. An example of the cellulose esters and cellulose ethers having the properties of (iii) is ethyl hydroxyethyl cellulose.

Ethyl hydroxyethyl cellulose mixed cellulose esters obtained by hydroxyethylation and ethylation of alkali cellulose with ethylene oxide and ethyl chloride, have properties of solubility in solvents which dissolve ethyl cellulose as well as in cycloaliphatic hydrocarbons and of insolubility in saturated aliphatic hydrocarbons. Ethyl hydroxyethyl cellulose can, however, be dissolved in saturated aliphatic hydrocarbons of a boiling point of from 35° to 180° C. under a heated condition, and accordingly if such a saturated aliphatic hydrocarbon is used alone, a dispersion system of a good dispersion stability will be formed by dispersing the aqueous monomer solution at a temperature of 55° C. or higher. In this case, the heating may be carried out under pressure, if necessary.

As the boiling point of the saturated aliphatic hydrocarbons used as the dispersing medium becomes higher, they also require a higher temperature for dissolving ethyl hydroxyethyl cellulose, and since those 35° boiling points higher than 180° C. can dissolve the cellulose with difficulty even at 100° C. or more, the saturated aliphatic hydrocarbons having boiling points of from 35° to 180° C. are advantageous if used alone. On the other hand, if solvents which dissolve ethyl hydroxyethyl cellulose are admixed, it is also possible to use saturated aliphatic hydrocarbons of the boiling points of from 35 to 400° C. as the dispersing medium and may give a dispersion system of good dispersion stability at room temperature.

Solvents dissolving ethyl hydroxyethyl cellulose include esters, ketones, alkyl halides, ethers, alcohols, aromatic hydrocarbons and halogenated aromatic hydrocarbons, for example, those having been mentioned hereinbefore in particular as solvents dissolving ethyl cellulose as well as cycloaliphatic hydrocarbons, for example, those having also been mentioned hereinbefore in particular as solvents for ethyl cellulose under a heated condition.

In cases where the above solvents are used together with the saturated aliphatic hydrocarbons as the dispersing medium, the solvents are advantageously added in the following amounts: the amount for esters, ketones, alkyl halides, ethers and alcohols is up to 0.3 time; aromatic and halogenated aromatic hydrocarbons is up to 1 time; and of the cycloaliphatic hydrocarbons is up to 10 times, based on the weight of the saturated aliphatic hydrocarbons, respectively.

The saturated aliphatic hydrocarbons of boiling points of from 35° to 180° C. which may be used as the dispersing medium under a heated condition for dissolving ethyl hydroxyethyl cellulose or together with other solvents include linear and branched saturated hydrocarbons, for example, pentane, hexane, heptane, octane, nonane and decane. The saturated linear hydrocarbons which may be used as the dispersing medium by mixing with other compounds dissolving ethyl hydroxyethyl cellulose may contain, for example, undecane, dodecane, tetradecane, octadecane, tetracosane or pentatriacontane.

From the above description, it will be appreciated that any suitable fraction of petroleum containing the saturated aliphatic hydrocarbons of boiling points of from 35° to 180° C. may also be used in a similar manner as the above saturated hydrocarbons. A petroleum fraction containing mostly saturated aliphatic hydrocarbons exhibits properties similar to those of saturated aliphatic hydrocarbons, and a petroleum fraction containing aromatic and cycloaliphatic hydrocarbons exhibits properties similar to those of a dispersing medium which is obtained by adding these aromatic and cycloaliphatic hydrocarbons to the aliphatic saturated hydrocarbons. Examples of petroleum fractions which may be used as the dispersing medium are petroleum ether, ligroin, kerosine and liquid paraffin.

The foregoing provides detailed directions for use of respective dispersing mediums which are suited for combined use with each of the dispersion stabilizers, for example cellulose acetate butyrate, ethyl cellulose and ethylhydroxyethyl cellulose. Although these and other cellulose esters and ethers may undergo changes in their behvior against solvents with the degree of substitution in the anhydrous glucose unit, it will be understood that other dispersion stabilizers than those which have particularly been described hereinbefore may also be used and give stable dispersed polymerization systems, if the dispersing medium gelatinizing or swelling these dispersion stabilizers is combined with "solvents dissolving the cellulose derivatives to be used as the dispersion stabilizer" or "solvents dissolving stabilizer under a heated condition".

The amount of the dispersion stabilizers to be added is from 0.05 to 10% by weight, preferably from 0.5 to 5% by weight, based on the dispersing medium. If it is smaller than 0.05% by weight, the dispersing power may be insufficient, while an amounts excess of 10% by weight may give products of very fine powder and further make the dispersion system more viscous to cause difficulties upon separation of the products.

The dispersing medium may be used from 0.5 to 10 times, preferably from 1 to 5 times, based on the weight of aqueous monomer solution containing the compound of formula I.

In carrying out the polymerization process according to the present invention, there is no restriction in the sequence of addition of the dispersion stabilizer, dispersing medium, aqueous monomer solution and radical polymerization initiator. However, in order to obtain products of uniform particle size, the following manner is advantageous: after removing oxygen by introducing nitrogen into the dispersing medium in which the dispersion stabilizer has been dissolved, the aqueous monomer solution containing the radical polymerization initiator, from which oxygen has similarly been removed, is added into the dispersing medium and then the mixture is stirred to disperse the aqueous monomer solution in the medium and the temperature is elevated to the range defined to initiate polymerization.

Although conventional radical polymerization initiators such as peroxides and azo compounds may be used as the initiator, water-soluble polymerization initiators are especially preferred, examples being peroxides such as ammonium persulfate, potassium persulfate, peracetic acid and hydrogen peroxide, and azo compounds such as 2,2'-azo-bis-2-amidinopropane hydrochloride, 4,4'-azo-bis-cyanopentanoic acid. If the peroxides are used as the initiator, it is also possible, as occasion demands, to carry out the redox polymerization in the presence of a reducing agent such as sodium metabisulfite, sodium sulfite or ferrous chloride.

Although the polymerization may be carried out at any suitable temperature of from 40° C. to a temperature at which the dispersing medium boils, in order to obtain the high-molecular weight polymers a temperature of from 50° to 70° C. is preferred.

Any stirring means may be used, and the reaction mixture is stirred in such a manner that the drops of the aqueous monomer solution in the dispersing medium become the desired particle size. Particle sizes of the bead polymers obtained depend on the size of drops. Although the bead polymers may have any particle size, it is in general from 0.05 to 1 mm and preferably from 0.1 to 1 mm.

The monomer concentration in the aqueous solution of the compound of the formula I or a mixture of the compound (I) and an other water-soluble vinyl monomer copolymerizable with the compound (I) may vary in the range of from 10 to 90% by weight.

According to the present invention, if the dispersion stabilizer and the dispersing medium are appropriately selected, it is possible to polymerize the aqueous monomer solution which contains the compound (I) in an amount of from 50 to 100 mole %, based on the sum of the water-soluble monomers, and in which the concentration of the vinyl monomer is of from 60 to 90% by weight, based on the aqueous solution, in a dispersed condition. Thus the present invention provides high-molecular weight products with a very good productivity, since high concentrations of the monomer solution can be used. Moreover, the polymerization with an aqueous solution whose monomer concentration is from 60 to 75% by weight gives the solid products after a short-time dehydration, when a monomer concentration of from 75 to 95% by weight is used, the solid product may be obtained without any dehydration. However, conventional dehydration methods may be applied to such water-containing polymers, for example, a extraction dehydration, for example, with methanol or acetone. On the other hand, when the amount of the compound I is 5 mole % or more and less than 50 mole %, based on the sum of the water-soluble vinyl monomers, it is difficult to polymerize the aqueous monomer solution of a higher monomer concentration, since the products formed tend to be insoluble in water.

If an aqueous solution of a monomer concentration of 10% by weight or more and lower than 60% by weight is used, water-soluble high-molecular weight polymers may be obtained. However, these polymers are highly viscous, gelatinous and water-containing spherical substances. Although such products can be lead to the bead solids by dehydrating on a laboratory scale, for example "by dispersing the products in 100 times of acetone" or "by drying the product being spread as a flat layer", it is extremely difficult to dehydrate or dry them to give the bead products by industrial methods.

An advantageous method is an azeotropic distillation of a dispersing medium-water azeotrope of water-containing products obtained by the suspension polymerization. A method has been known of suspension polymerization in which an aqueous solution of a water-soluble monomer is dispersed in a hydrophobic dispersing medium using a nonionic emulsifier to form water-in-oil type or oil-in-water type emulsion. If such method is applied to the polymerization of the aqueous water-soluble monomer solution containing from 5 to 50 mole % of the compound (I), and then the suspension after polymerization is subjected to the azeotropic distillation, there will be obtained the lumpy polymers in many cases.

However, even if the suspensions of the water-soluble polymers which are formed by the polymerization according to the present invention by using the dispersion stabilizer and the dispersing medium are subjected to a dispersion medium-water azeotropic distillation under heating, the particles of the water-soluble polymers do not adhere one another. Thus, it is possible to continuously carry out the polymerization step and the dehydration step by the azeotropic distillation, the dispersion stabilizer displaying its effect in each step. Accordingly, one of essential features of the present invention is the fact that, in such manner, the solid bead polymer products can be obtained by using from 10 to 60% by weight of the aqueous solutions containing the compound I and another monomer as the starting material.

For the purpose of the dehydration by azeotropic distillation, the dispersing medium must be a compound forming an azeotrope with water when the medium is a single component. However, if the dispersing medium is a multi-component system, it is sufficient that one component of the system forms an azeotrope with water. In the case where the dispersing medium is the mixed solvent, the amount corresponding to the distilled medium should be continuously supplemented during the azeotropic distillation for keeping a good dispersion stability with a constant composition of the medium.

If the dispersing medium is almost immiscible with water, the dispersing medium may be separated from the distilled azeotrope and recycled to maintain the composition of the medium constant. Carrying out the dehydration by azeotropic distillation until the water content of the polymers becomes up to 20% and preferably up to 15%, the polymers obtained will be solid products.

From the above description, it will be appreciated that it is possible to obtain the solid bead polymers by separating off the dispersing medium from the products which have been formed by either the method using the aqueous monomer solution of high concentration or the method using the aqueous monomer solution of low concentration and dehydrating by azeotropic distillation. If the dispersing medium containing a compound of a boiling point of 150° C. or higher, the polymers should be washed with a solvent of a boiling point of lower than 150° C. on the separation of the dispersing medium. Also, in the case when ethyl cellulose or hydroxyethyl cellulose is used as the dispersion stabilizer, the polymers should be washed with a solvent dissolving these cellulose derivatives, since the surface of the bead polymers separated becomes tacky upon directly drying them to reduce the dispersing medium. On the other hand, the products obtained by using cellulose acetate butyrate as the dispersion stabilizer do not require washing; the coating of cellulose acetate butyrate remaining on the surface of the bead polymers rather displays an effect preventing the products from adhering.

Having thus described preferred embodiments of the present invention, it will be apparent that the present invention enables carrying out the polymerization of from 60 to 90% by weight aqueous solution containing the monomer of the formula I or a mixture of I and another monomer in the droplet dispersed state, since very stable dispersion systems can be formed by the combined use of the dispersion stabilizer and the dispersing medium according to the present invention without any operation, for example, equalizing the specific density of the aqueous monomer solution and the dispersing medium. In this case, the dehydration operation may be significantly improved or eliminated. Furthermore, the present invention provides solid bead polymers of uniform particle size and of good handling characteristics in a simple manner in which the gelatinous products containing a large amount of water, which are formed after the polymerization, are dehydrated by the dispersing medium-water azeotropic distillation.

EXAMPLES 1 TO 12 AND COMPARATIVE EXAMPLES 1 TO 4

2 g of a dispersion stabilizer shown in Table 1 was dissolved in 90 g of a dispersing medium also shown in Table 1, and the solution was fed into a 200 ml four-necked separable flask which is equipped with a condenser, a nitrogen introducing tube, a dropping funnel and a stirring blade made of polytetrafluoroethylene. 29.7 g of 80% aqueous solution of $\beta$-methacryloyloxyethyl trimethyl ammonium chloride and 0.3 g of b 20% aqueous solution of 2,2'-azo-bis-2-amidinopropane hydrochloride were fed into the dropping funnel. After removing oxygen from the reaction vessel and the dropping funnel by introducing nitrogen thereinto, the aqueous monomer solution in the dropping funnel was introduced into the vessel which was heated to 60° C. while stirring at 100 r.p.m. Then the reaction mixture was heated to 60° C. for 2 hours while stirring at from 110 to 150 r.p.m. After cooling, the product was filtered off and dried to remove the dispersing medium; thus a solid bead polymer free from very fine powder was obtained without dehydration. There was observed in each case no adhesion to the reaction vessel or the stirring blade. The reduced viscosity of each of the products was measured at 25° C. for 0.1% of the product in 1 normal aqueous sodium chloride. The results are given in Table 1.

Table 1

| | Dispersing medium | Ratio by weight | n | Dispersion Stabilizer | Form of the product | Reduced viscosity of the product $\eta sp/c$ (0.1% 1N-NaCl, 25° C.) |
|---|---|---|---|---|---|---|
| Example | | | | | | |
| 1 | Ethyl acetate | — | — | Cellulose acetate Acetyl group 40% by weight | Bead Containing a small amount of lumps. | 7.7 |
| 2 | Toluene : Ethyl acetate | 1/1 | 2 | Cellulose acetate butyrate Acetyl group 29.5% by weight Butyryl group 17% by weight | Bead, uniform particle size | 8.3 |
| 3 | Toluene : Methoxy ethyl acetate | 1/1 | 2 | " | " | 7.0 |
| 4 | Xylene : Ethyl acetate | 1/1 | 2 | " | " | 7.8 |
| 5 | Chlorobenzene : Ethyl acetate | 1/1 | 2 | " | " | 6.9 |
| 6 | Benzene : Ethyl acetate | 2/1 | 3 | " | " | 8.0 |
| 7 | Toluene : Butyl acetate | 1/1 | 2 | Cellulose acetate butyrate Acetyl group 13% by weight Butyryl group 37% by weight | " | 7.9 |
| 8 | Toluene : Methyl caproate | 1/5 | 0.4 | Cellulose acetate butyrate Acetyl group 13% by weight Butyryl group 37% by weight | Bead, uniform particle size | 7.0 |
| 9 | Chlorobenzene : Ethyl acetate | 9/1 | 18 | " | " | 6.6 |
| 10 | Toluene : Ethyl acetate | 7/1 | 10 | Cellulose acetate butyrate Acetyl group 6% by weight Butyryl group 48% by weight 5g has been used | " | 7.5 |
| 11 | Chlorobenzene : Ethyl acetate | 1/4 | 1/2 | Cellulose acetate phthalate | " | 7.6 |
| 12 | Toluene : Ethyl acetate | 10/1 | 20 | Ethylcellulose Ethoxy group 45–46.5% | " | 8.85 |

Table 1-continued

| | Dispersing medium | Ratio by weight | n | Dispersion Stabilizer | Form of the product | Reduced viscosity of the product $\eta sp/c$ (0.1% 1N-NaCl, 25° C.) |
|---|---|---|---|---|---|---|
| Example of comparison | | | | by weight | | |
| 1 | Toluene | — | — | None | Lump | 6.5 |
| 2 | Chlorobenzene | — | — | " | " | 6.0 |
| 3 | Toluene | — | — | Sorbitan monolaurate | " | 5.0 |
| 4 | Chlorobenzene | — | — | Sorbitan monoleate | " | 5.8 |

EXAMPLES 13 TO 32

3 g of a dispersion stabilizer shown in Table 2 was dissolved in 100 g of dissolving medium also shown in Table 2 and the solution thus obtained was fed into a 200 cc four-necked flask which is equipped with a condenser (cooling tube), a nitrogen introducing tube, a dropping funnel and a stirring blade made of polytetrafluoroethylene. 50 g of 80% aqueous solution of β-methacryloyloxyethyl trimethyl ammonium chloride and 1 g of 10% aqueous solution of 2,2'-azo-bis-2-amidinopropane hydrochloride were fed into the dropping funnel. After removing oxygen from the reaction vessel and the dropping funnel by introducing nitrogen thereinto, the aqueous monomer solution in the dropping funnel was introduced into the reaction vessel while stirring at 100 r.p.m. Then, the reaction mixture was held in a nitrogen atmosphere at 60° C. for one hour while being stirred at 110-150 r.p.m. After cooling, the product was filtered and dried to remove the dispersing medium; thus solid uniform grain bead form polymer free from fine powder was obtained without dehydration. There was observed in each case no adhesion to the reaction vessel or the stirring blade during polymerization. The results are as shown in Table 2.

Table 2

| | Dispersing medium | Ratio by weight | n | Dispersion stabilizer | Form of the product | Reduced viscosity of the product, $\eta sp/c$ (0.1%/N-NaCl 25° C.) |
|---|---|---|---|---|---|---|
| Example | | | | | | |
| 13 | Toluene : Cyclohexanone | 1/2 | 1 | Cellulose acetate, acetyl group 9.4% by weight | Bead, uniform Particle size | 5.9 |
| 14 | Toluene : Acetone | 3/1 | 4 | Cellulose acetate butyrate Acetyl group 29.5% by weight Butyryl group 17% by weight | " | 9.4 |
| 15 | Toluene : MEK | 2/1 | 3 | " | " | 8.7 |
| 16 | Xylene : Cyclohexanone | 2/1 | 3 | " | 7.6 | |
| 17 | Chlorobenzene : Cyclohexanone | 2/1 | 3 | " | " | 6.9 |
| 18 | Toluene : Acetone | 5/1 | 6 | Cellulose acetate butyrate Acetyl group 13% by weight Butyryl group 37% by weight | " | 9.5 |
| 19 | Chlorobenzene : Acetone | 9/1 | 18 | " | " | 8.5 |
| 20 | Toluene : MEK | 4/1 | 5 | Cellulose acetate butyrate Acetyl group 13% by weight Butyryl group 37% by weight | Bead, uniform particle size | 9.3 |
| 21 | Toluene : MIBK | 3/1 | 4 | " | " | 9.9 |
| 22 | Chlorobenzene : MIBK | 9/1 | 18 | " | " | 9.8 |
| 23 | Chlorobenzene : Cyclohexanone | 19/1 | 38 | " | " | 8.6 |
| 24 | Toluene : Acetophenone | 3/1 | 4 | " | " | 9.3 |
| 25 | Chlorobenzene : Methyl benzoate | 3/1 | 4 | " | " | 8.0 |
| 26 | Toluene : Diethyl phthalate | 2/1 | 3 | " | " | 9.8 |
| 27 | Clorobenzene : Diethyl phthalate | 3/1 | 4 | " | " | 9.8 |
| 28 | Toluene : 1,2-Dichloroethane | 1/2 | 1 | " | " | 8.9 |
| 29 | Xylene : 1,2-Dichlo- | 1/2 | 1 | " | " | 9.1 |

Table 2-continued

|    | Dispersing medium | Ratio by weight | n | Dispersion stabilizer | Form of the product | Reduced viscosity of the product, $\eta sp/c$ (0.1%/N-NaCl 25° C.) |
|----|---|---|---|---|---|---|
|    | roethane | | | | | |
| 30 | Chlorobenzene : 1,2-Dichloroethane | 1/2 | 1 | " | " | 8.9 |
| 31 | Toluene : Pentachloethane | 1/2 | 1 | Cellulose acetate butyrate Acetyl group 13% by weight Butyryl group 37% by weight | Bead, uniform particle size | 7.5 |
| 32 | Toluene : 1,2-Dichloropropane | 1/4 | 1/2 | " | " | 7.2 |

EXAMPLE 33

300 g of ethyl acetate was fed into a 1 l separable flask which is equipped with a condenser, a nitrogen introducing tube, a dropping funnel and a stirring blade made of stainless steel. After 12 g of cellulose acetate butyrate (Acetyl group; 29.5% by weight and butyryl group; 17% by weight) was added and dissolved in the flask, 300 g of toluene was added and stirred until uniformity of solution was ensured. 200 g of 80% aqueous solution of β-methacryloyloxyethyl trimethyl ammonium chloride and 2 g of 20% aqueous solution of 2,2'-azo-bis-2-amidinopropane hydrochloride were fed into the dropping funnel. After removing oxygen from the reaction vessel and the dropping funnel by introducing nitrogen thereinto, the aqueous monomer solution in the dropping funnel was introduced into the reaction vessel while being stirred at 100 r.p.m. Then, the reaction mixture was heated to 60° C. for two hours for polymerization while being stirred at 150 r.p.m. After cooling, the product was filtered, washed with ethyl acetate and dried to obtain 200.2 g of glass bead form polymer. There was observed in each case no adhesion to the glass reaction vessel or the stirring blade. 97% of the product was more than 100 mesh and less than 20 mesh and very little fine powder was produced. Reduced viscosity (0.1% solution at 25° C.) of 0.1% of the product in 1N-NaCl solution of salt ($\eta sp/c$) was 11.9.

Instead of using β-methacryloyloxyethyl trimethyl ammonium chloride (DMAEMA.MC) used in Example 33, polymerizing processes were performed in the same manner employed in the example 33 by using 200 g of various aqueous monomer solutions shown in Table 3. The results were as shown in the following:

Table 3

|         | Monomer | Concentration of monomer (weight %) | Form of product | Reduced viscosity of product ($\eta sp/c$ 0.1% - 1N NaCl 25° C.) |
|---|---|---|---|---|
| Example 44 | DMAEMA . MC (60 mole %) AAM (40 mole %) | 70% | Bead, uniform particle size | 7.8 |
| 35 | DMAEMA . MS | 80% | " | 2.3 |
| 36* | DMAEMA . MS (10 mole %) AAM (90 moles %) | 50% | Uniform particle size | 6.9 |
| 37 | DMAEMA . ½H$_2$SO$_4$ | 80% | " | 6.9 |
| 38 | DMAEA . EB | 80% | " | 1.9 |

AAM: Acrylamide
DMAEMA . MC: β-methacryloyloxyethyl trimethyl ammonium chloride
DMAEMA . MS: β-methacryloyloxyethyl trimethyl ammonium methyl sulfate
DMAEMA ½H$_2$SO$_4$: Neutralized salt produced by adding sulfuric acid to dimethylaminoethylmethacrylate. PH value of 1% aqueous solution was 6.
DMAEA . EB: β-acryloyloxyethyl dimethylethyl ammonium bromide
*2g of 20% aqueous solution of ammonium persulfate was used as the polymerizatio initiator.

EXAMPLES 39 TO 41

33.3 g of a diethylphthalate and 66.7 g of toluene were introduced into a 200 cc four-necked separable flask which was equipped with a condenser, a nitrogen introducing tube, a dropping funnel and a stirring blade made of polytetrafluoroethylene and, then, 3 g of cellulose acetate butyrate (acetyl group; 13% by weight and butyryl group; 37% by weight) was added thereto and dissolved therein. 50 g of aqueous monomer solution shown in Table 4 and the specified quantity of 10% aqueous solution of polymerization initiator were added to the dropping funnel and oxygen was removed by introducing nitrogen gas into the reaction vessel and the dropping funnel. Then, the aqueous monomer solution in the dropping funnel was introduced into the reaction vessel while stirring at 100 r.p.m. Then, the reaction mixture was heated while stirring at 110–150 r.p.m. and kept at 60° C. for one hour in the nitrogen atmosphere. The results are shown in Table 4.

Table 4

|  | Monomer | Concentration of monomer (weight %) | Polymerization initiator | Polymerization initiator Quantity added (Weight % of initiator in aqueous monomer solution) | Form of product | Reduced viscosity of product $\eta sp/c$ 0.1% 1N-NaCl 25° C. |
|---|---|---|---|---|---|---|
| Example |  |  |  |  |  |  |
| 39 | DMAEMA . MC (60 mole %) AAM (40 mole %) | 80 | ABA . 2HCl | 0.2 | Bead, uniform particle size | 11.5 |
| 40 | DMAEMA . MC (10 mole %) AAM (90 mole %) | 40 | " | " | " | 10.8 |
| 41 | DMAEMA . MS | 85 | " | " | " | 2.4 |

ABA . 2HCl : 2,2'-Azo-bis-2-amidinopropane hydrochloride.

EXAMPLES 42 TO 47

The aqueous monomer solution shown in Table 5 was polymerized in the same manner as in Examples 39 to 41, except using 20 g of methylethyl ketone and 80 g of toluene instead of 33.3 g of diethyl phthalate and 66.7 g of toluene. The results are as shown in Table 5.

made of polytetrafluoroethylene and, then, 3 g of cellulose acetate butyrate (acetyl group; 13% by weight of butyryl group; 37% by weight) was added thereto. A designated amount of monomer solution and 10% aqueous solution of polymerization initiator were added to the dropping funnel and oxygen was removed by introducing nitrogen gas into the reaction vessel and the Table 5

|  | Monomer | Concentration of aqueous monomer solution (Weight %) | Polymerization initiator | Polymerization initiator Quantity added (Weight & of initiator in aqueous monomer solution) | Form of Product | Reduced viscosity of product $\eta sp/c$ (0.1% 1N-NaCl 25° C.) |
|---|---|---|---|---|---|---|
| Example |  |  |  |  |  |  |
| 42 | DMAEMA . MC | 80 | APS | 0.2 | Bead, uniform particle size | 5.3 |
| 43 | DMAEMA . MC (60 mole %) AAM (40 mole %) | 80 | ABA . 2HCl | 0.2 | " | 8.9 |
| 44 | DMAEMA . MC (10 mole %) AAM (90 mole %) | 40 | ABA . 2HCl | 0.05 | " | 8.0 |
| 45 | DMAEMA . MS | 85 | ABA . 2HCl | 0.2 | " | 2.0 |
| 46 | DMAEMA . ½H₂SO₄ (60 mole %) AAM (40 mole %) | 70 | ABA . 2HCl | 0.2 | " | 9.3 |
| 47 | DEAEA . EB (10 mole %) AAM (90 mole %) | 40 | ABA . 2HCl | 0.05 | " | 8.0 |

DEAEA . EB : β-Acryloyloxyethyltriethylammonium bromide
APS : Ammonium persulfate

EXAMPLES 48 TO 53

65.7 g of 1.2-dichloroethane and 33.3 g of xylene were introduced into a 200 cc four-necked separable flask which was equipped with a condenser, a nitrogen introducing tube, a dropping funnel and a stirring blade dropping funnel. Then, the aqueous monomer solution in the dropping funnel was introduced into the reaction vessel while stirring at 100 r.p.m. Then, the reaction mixture was heated while stirring at 110-150 r.p.m. and kept at 60° C. for one hour in the nitrogen atmosphere. The results are as shown in Table 6.

Table 6

|  | Monomer | Concentration of aqueous monomer solution (weight %) | Polymerization initiator | Quantity of added polymerization initiator (Weight % of initiator in aqueous monomer solution) | Form of product | Reduced viscosity of product $\eta sp/c$ (0.1% 1N-NaCl 25° C.) |
|---|---|---|---|---|---|---|
| Example |  |  |  |  |  |  |
| 48 | DMAEMA MC | 80% | APS | 0.2% | Bead, uniform particle size |  |
| 49 | DMAEMA . MC (60 mole %) AAM (40 mole %) | 80% | ABA . 2HCl | 0.2% | " | 10.1 |
| 50 | DMAEMA . MC (10 mole %) AAM (90 mole %) | 40% | ABA . 2HCl | 0.05% | Hydrated substance, uniform particle size | 11.2 |
| 51 | DMAEMA . MS | 85% | ABA . 2HCl | 0.2% | Bead, uniform particle size | 2.4 |
| 52 | DMAEMA . ½H₂SO₄ (60 mole %) AAM (40 mole %) | 70% | ABA . 2HCl | 0.2% | " | 9.7 |
| 53 | DEAEA . EB (10 mole %) | 40% | ABA . 2HCl | 0.05% | Hydrated |  |

Table 6-continued

| Monomer | Concentration of aqueous monomer solution (weight %) | Polymerization initiator | Quantity of added polymerization initiator (Weight % of initiator in aqueous monomer solution) | Form of product | Reduced viscosity of product ηsp/c (0.1% 1N-NaCl 25° C.) |
|---|---|---|---|---|---|
| AAM (90 mole %) | | | | substance, uniform particle size | 9.2 |

EXAMPLES 54 TO 63

3 g of dispersion stabilizer shown in Table 7 was dissolved in 100 g of dispersion medium also shown in Table 7 and the solution was fed into a 200 cc four-necked separable flask which was equipped with a condenser, a nitrogen introducing tube, a dropping funnel and a stirring blade made of polytetrafluoroethylene. 50 g of 80% aqueous solution of β-methacryloyloxyethyl trimethylammonium chloride and 1 g of 10% aqueous solution of 2,2'-azo-bis-2-amidinopropane hydrochloride were fed into the dropping funnel. After removing oxygen from the reaction vessel and the dropping funnel by introducing nitrogen thereinto, the aqueous monomer solution in the dropping funnel was introduced into the vessel under stirring at 100 r.p.m. Then, the reaction mixture was heated to 60° C. for one hour while stirring at 200 to 250 r.p.m. After cooling, the product was filtered and washed with ethyl acetate and ethyl acetate was evaporated; thus a bead form polymer free from fine powder was obtained without dehydration. There was observed in each case no adhesive to the reaction vessel or stirring blade during polymerization. The results are shown in Table 7.

Table 7

| | | Dispersing medium | Weight ratio | Dispersion stabilizer | Form of product | Reduced viscosity of product ηsp/c (0.1% 1N-NaCl 25° C.) |
|---|---|---|---|---|---|---|
| Example | 54 | Cyclohexane/Toluene | 3/1 | Ethyl-cellulose ethoxy group (48.0–49.5% by weight) | Bead, uniform particle size | 7.2 |
| | 55 | Cyclohexane/Toluene | 3/1 | " | " | 7.1 |
| | 56 | Cyclohexane/Chlorobenzene | 3/1 | " | " | 7.3 |
| | 57 | Cyclohexane/Ethyl acetate | 3/1 | " | " | 7.8 |
| | 58 | Cyclohexane/Diethyl phthalate | 3/1 | " | " | 8.1 |
| | 59 | Cyclohexane/Methyl ethyl ketone | 3/1 | " | " | 7.0 |
| | 60 | Cyclohexane/Acetophenone | 3/1 | " | " | 7.9 |
| | 61 | Cyclohexane/1.2-Dichloroethane | 3/1 | " | " | 6.3 |
| | 62 | Cyclohexane/Di-n-butyl ether | 10/1 | " | " | 8.0 |
| | 63 | Cyclohexane/n-butanol | 10/1 | " | " | 7.5 |

EXAMPLES 64 TO 68 AND COMPARATIVE EXAMPLE 5

After the dispersion stabilizer was dissolved in the dispersing medium at 70° C. in conformity with the method employed in the examples 54 to 63, an aqueous monomer solution was added thereinto while heating the solution at 60° C. Then, the solution was polymerized under the same conditions described in the examples 54 to 63. The results were as shown in Table 8.

Table 8

| | | Dispersing medium | Dispersion stabilizer | Form of product | Reduced viscosity of product ηsp/c (0.1% 1N-NaCl 25° C.) |
|---|---|---|---|---|---|
| Example | 64 | Cyclohexane | Ethylcellulose (Ethoxy group 47.5 - 49% by weight) | Bead, uniform particle size | 7.6 |
| | 65 | Cyclohexane | Ethylcellulose (Ethoxy group 48 - 49.5% by weight) | " | 7.7 |
| | 66 | Methylcyclohexane | " | " | 6.9 |
| | 67 | Cyclooctane | " | " | 7.2 |
| | 68 | Decalin | " | " | 7.5 |
| Comparative example | 5 | Cyclohexane | Polyoxyethylenenonylphenylether | Lump form polymer | 6.0 |

EXAMPLES 69 TO 74

75 g of cyclohexane and 25 g of chlorobenzene were introduced into a 200 cc four-necked separable flask which was equipped with a condenser, a nitrogen introducing tube, a dropping funnel and a stirring blade made of polytetrafluoroethylene and 3 g of ethylcellulose (Ethoxy group 48.0–49.5% by weight) was added to the solution and dissolved. 50 g of an aqueous monomer solution shown in Table 9 and the specified quantity of 10% aqueous solution of polymerization initiator were fed into the dropping funnel. After removing oxygen from the reaction vessel and the dropping funnel by introducing nitrogen thereinto, the aqueous monomer solution in the dropping funnel was introduced into the reaction vessel while stirring at 100 r.p.m. Then, the reaction mixture was heated to 60° C. for one hour while stirring at 200 to 250 r.p.m. in the nitrogen atmosphere. The results are shown in Table 9.

into a 200 cc four-necked separable flask which was equipped with a condenser, a nitrogen introducing tube, a dropping funnel and a stirring blade made of polytetrafluoroethylene. While removing oxygen by introducing nitrogen, the solution was heated to 60° C., 50 g of 80% β-methacryloyloxyethyl trimethylammonium chloride and 1 g of 10% aqueous solution of 2,2'-azo-bis-2-amidinopropane hydrochloride were fed into the dropping funnel and nitrogen gas was introduced thereinto. Then, the mixture was dropped into the aqueous monomer solution in the dropping funnel while being stirring at 200 to 250 r.p.m. and heated at 60° C. for one hour in the nitrogen atmosphere. The results are shown in Table 10.

Table 10

| | | Dispersing medium | Mixing rate | Dispersion stabilizer | Form of product | Reduced viscosity of product $\eta sp/c$ (0.1% 1N-NaCl, 25° C.) |
|---|---|---|---|---|---|---|
| Example | 75 | n-Hexane/Ethyl acetate | 20/1 | Ethylhydroxyethyl cellulose | Bead, uniform particle size | 9.7 |
| | 76 | n-Hexane/Acetone | 20/1 | " | " | 9.5 |
| | 77 | n-Hexane/1,1,2-Trichloroethane | 20/1 | " | " | 9.6 |
| | 78 | n-Hexane/n-dibutylether | 20/1 | " | " | 9.1 |
| | 79 | n-Hexane/Toluene | 20/1 | " | " | 8.1 |
| | 80 | n-Hexane/Chlorobenzene | 20/1 | " | " | 9.7 |
| | 81 | n-Hexane/Cyclohexane | 1/4 | " | " | 8.9 |
| | 82 | n-Heptane/Cyclohexane | 1/4 | " | " | 9.8 |
| | 83 | n-Heptane/Cyclohexane | 1/1 | " | " | 9.3 |
| | 84 | n-Heptane/Methylcyclohexane | 1/4 | " | " | 9.4 |
| | 85 | n-Heptane/Cyclooctane | 1/4 | " | " | 9.7 |
| | 86 | n-Heptane/Decalin | 1/4 | " | " | 9.3 |
| | 87 | Tetradecane/Cyclohexane | 1/3 | " | " | 9.7 |
| | 88 | Kerosene/Cyclohexane | 1/4 | " | " | 6.1 |
| | 89 | Liquid paraffin/cyclohexane | 1/2 | " | " | 9.8 |

EXAMPLES 90 TO 93

Ethylhydroxyethyl cellulose was dissolved in the dispersing medium shown in Table 11 by heating and, then, the solution was polymerized under the same conditions described in the examples 75 to 89, except for the polymerizing temperature shown in Table 11. The results are shown in Table 11.

Table 9

| | | | Concentration of monomer | Polymerization initiator | Polymerization initiator Quantity added (Weight % of initiator in aqueous monomer solution) | Form of product | Reduced viscosity of product $\eta sp/c$ (0.1% 1N-NaCl 25° C.) |
|---|---|---|---|---|---|---|---|
| Example | 69 | DMAEMA MC | 80% | APS | 0.2% | Bead, uniform particle size | 4.4 |
| | 70 | DMAEMA MC (60 mole %) AAM (40 mole %) | 80% | ABA . 2HCl | 0.2% | " | 8.7 |
| | 71 | DMAEMA MC (10 mole %) AAM (90 mole %) | 40% | ABA . 2HCl | 0.05% | " | 10.4 |
| | 72 | DMAEMA MS | 85% | ABA . 2HCl | 0.2% | " | 2.4 |
| | 73 | DMAEMA ½H₂SO₄ (60 mole %) AAM (40 mole %) | 70% | ABA . 2HCl | 0.2% | " | 9.7 |
| | 74 | DEAEA EB (10 mole %) | 40% | ABA . 2HCl | 0.05% | " | 7.5 |

EXAMPLES 75 TO 89

100 g of the dispersing medium shown in Table 10 and 3 g of ethylhydroxyethyl cellulose were introduced

Table 11

| | | | Dissolving temperature of dispersing medium | Polymerizing temperature | Form of product | Reduced viscosity of product $\eta sp/c$ (0.1% in 1N-NaCl 25° C.) |
|---|---|---|---|---|---|---|
| Example | 90 | n-Hexane | 65° C. | 60° C. | Bead, uniform particle size | 8.8 |
| | 91 | n-Heptane | 70° C. | 60° C. | " | 9.1 |

Table 11-continued

|  | | Dissolving temperature of dispersing medium | Polymerizing temperature | Form of product | Reduced viscosity of product ηsp/c (0.1% in 1N-NaCl 25° C.) |
|---|---|---|---|---|---|
| 92 | n-Octane | 90° C. | 70° C. | " | 7.1 |
| 93 | Kerosene | 70° C. | 60° C. | " | 5.2 |

EXAMPLES 94 TO 99

180 g of ethyl acetate was introduced into a 1 l separable flask equipped with a condenser, a nitrogen introducing tube, a dropping funnel and an anchor type stirring blade made of stainless steel. 7.2 g of cellulose acetate butyrate (Acetyl group; 29.5% by weight and Butyryl group; 37% by weight) was added and dissolved, then, 180 g of toluene was added to the solution and stirred until uniform mixture was obtained. 240 g of an aqueous monomer solution shown in Table 12 and 2.4 g of a 10% solution of 2,2'-azo-bis-2-amidinopropane hydrochloride were fed into the dropping funnel. After removing oxygen from the reaction vessel and the dropping funnel by introducing nitrogen thereinto, the aqueous monomer solution in the dropping funnel was introduced into the vessel while being stirred at 100–120 r.p.m. Then, the reaction mixture was heated while being stirred at 120–150 r.p.m. and held at 50° C. for 3 hours while being stirred in the nitrogen atmosphere. Then, the flow of nitrogen was stopped, the condenser (cooling tube) was disconnected and an azeotropic distillation device was provided. The temperature was kept at 90°–93° C. and dehydrated by the azeotropic distillation. After most of water was distillated, the product was cooled and the dispersing medium removed; thus a uniform solid bead polymer was obtained. During the azeotropic distillation, there was observed little adhesion of polymer beads to each other or of polymer particles to the reaction vessel.

More than 95% (by weight) of the particles were 0.1 mm to 1.0 mm in size and the yield was more than 94%. The results are shown in Table 12.

Table 12

| Example | Aqueous monomer solution used | Water content in polymer (Weight %) Before dehydration | Water content in polymer (Weight %) After dehydration | Form of product | Reduced viscosity of product ηsp/c (0.1% 1N-NaCl 25° C.) |
|---|---|---|---|---|---|
| 94 | DMAEMA.MC (80 mole %) AAM (20 mole %) (60% aqueous solution) | 40% | 15% | Bead, uniform particle size | 6.1 |
| 95 | DMAEMA.MC (40 mole %) AAM (60 mole %) (60% aqueous solution) | 40% | 16% | " | 8.2 |
| 96 | DMAEMA.MC (10 mole %) AAM (90 mole %) (40% aqueous solution) | 60% | 13% | " | 15.0 |
| 97 | DMAEMA.MS (10 mole %) AAM (90 mole %) (40% aqueous solution) | 60% | 12% | " | 9.1 |
| 98 | DMAEMA.½ H₂SO₄ (10 mole %) AAM (90 mole %) (40% aqueous solution) | 60% | 13% | " | 8.6 |
| 99 | DEAEA.EB (10 mole %) AAM (90 mole %) (40% aqueous solution) | 60% | 11% | " | 10.2 |

(Dispersing medium Toluene/Ethyl acetate [Weight ratio] Weight ratio x = 1/1  n = 2)

EXAMPLES 100 TO 101 AND COMPARATIVE EXAMPLES 6 TO 7

3.0 g of a dispersing agent shown in Table 13 was dissolved in 100 g of a dispersing medium also shown in Table 13, and the solution thus obtained was fed into a 200 cc separable flask equipped with a condenser, a thermometer, a nitrogen introducing tube, a dropping funnel and stirring blade made of polytetrafluoroethylene. With the use of 50 g of 40% aqueous monomer solution, a mixture of 10 mol % of DMAEMA and 90 mol % of AAM, the polymerization was carried out similarly to examples 94 to 99.

The results are shown in Table 13.

EXAMPLES 102 TO 104

Polymerization was performed at 60° C. by using the dispersing medium and the stabilizer shown in Table 13. Other conditions were similar to those in Examples 94 to 99.

The results are shown in Table 13.

Table 13

| | Dispersing medium | Weight ratio | n | Dispersing agent | Form of product | Reduced viscosity of product ηsp/c (0.1% 1N-NaCl 25° C.) |
|---|---|---|---|---|---|---|
| Example 100 | Toluene/Diethyl phthalate | 2/1 | 3 | Cellulose acetate butyrate | Bead, uniform particle size | 10.8 |

Table 13-continued

| | Dispersing medium | Weight ratio | n | Dispersing agent | Form of product | Reduced viscosity of product ηsp/c (0.1% 1N-NaCl 25° C.) |
|---|---|---|---|---|---|---|
| 101 | Xylene/1,2-Dichloroethane | 1/2 | 1 | Acetyl group 13% by weight Butyryl group 17% by weight " | " | 11.2 |
| 102 | Cyclohexane | — | — | Ethyl cellulose (Ethoxy group 47.5–49 weight %) | " | 9.2 |
| 103 | Cyclohexane | — | — | Ethyl cellulose (Ethoxy group 48–49.5 weight %) | " | 9.8 |
| 104 | Cyclohexane/Liquid paraffin | 3/1 | — | Ethylhydroxyethyl cellulose | " | 8.7 |
| Comparative example | | | | | | |
| 6 | Cyclohexane | — | — | Polyoxyethylene Nonylphenylether | Lump form polymer | 9.5 |
| 7 | Toluene | — | — | Sorbitanmonolaurate | " | 7.1 |

In the above examples, the following were used as cellulose ester and cellulose ether.

| | | |
|---|---|---|
| Cellulose acetate | | |
|   Eastman Kodak Chemicals | Acetyl content 39.4 wt% | |
| Cellulose acetate butyrate | | |
|   Eastman Kodak Chemicals | CAB171 Butyryl 17wt% acetyl 29.5wt% | |
| | CAB381 Butyryl 37wt% acetyl 13wt% | |
| | CAB500 Butyryl 48wt% acetyl 6wt% | |
| Cellulose acetate phthalate | | |
|   Wako Pure Chemical | CAP-wako | |
| Ethyl Cellulose | | |
|   Dow Chemical Corporation | ETHOCEL MED Ethoxy 45–46.5wt% | |
| | ETHOCEL STD Ethoxy 48–49.5wt% | |
|   Hercules Incorporation | Ethyl Cellulose N Type | |
| | Ethoxy 47.5–49.0wt% | |
| Ethylhydroxyethyl Cellulose | | |
|   Hercules Incorporation | EHEC Low | Viscosity: 25 to 35 centi poise, (25° C., 5% in a solvent mixture of 80 parts by weight toluene and 20 parts ethanol) |

The following were used as the raw monomer and initiator.

| Name of raw material | Manufacturer | Trade name |
|---|---|---|
| AAM | Mitsubishi Kasei Kogyo | — |
| DMAEMA . MC (Dimethylaminoethyl-methacrylate) | Mitsubishi Rayon | Acryester DM-MC |
| DMAEMA | Mitsubishi Rayon | Acryester DM |

DMAEMA . MS, DMAEMA . ½H₂SO₄, used in the examples were obtained by reacting DMAEMA with dimethyl sulfate and neutralizing with sulfuric acid.

| | | |
|---|---|---|
| DMAEA and DEAEA | | |
|   NIPPON NYUKAZAI CO., LTD. | | |

DMAEA . EB and DEAEA . EB were obtained by reacting DMAEA and DEAEA with ethyl bromide

| | | |
|---|---|---|
| ABA . 2HCl | Wako Pure Chemical | V-50 |

What is claimed is:

1. A process for preparing a water-soluble bead polymer comprising:

(a) forming an aqueous monomer solution containing 60% to 90% by weight of a monomer selected from the group consisting of:

(1) a compound of the general formula I

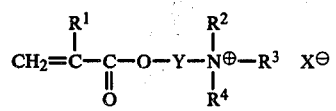

(I)

wherein $R^1$ is hydrogen or methyl, $R^2$ and $R^3$ may be the same or different and each is linear or branched alkyl of from 1 to 4 carbon atoms, $R^4$ is hydrogen, linear or branched alkyl of from 1 to 8 carbon atoms, hydroxy alkyl of from 1 to 4 carbon atoms, or benzyl, Y is alkylene or hydroxyalkylene of from 2 to 4 carbon atoms, and $X^-$ is an anion, and (2) a mixture of the compounds of the formula I and a water-soluble vinyl monomer copolymerizable with the compound (I), wherein this compound of of formula I is from 50 up to 100 mol % of the total amount of the monomers;

(b) dispersing said aqueous monomer solution as droplets in a dispersion medium which is non-compatible with the aqueous monomer solution and which is inert under polymerization conditions, said dispersion medium containing, as a dispersion stabilizer, 0.05 to 10% by weight of a cellulose ester or a cellulose ether which is insoluble in water but soluble in the dispersion medium; and (c) polymerizing the monomer in the droplets at a temperature of from 40° C. to the temperature at which the dispersion medium boils, in the presence of a free radical polymerization initiator and in the absence of oxygen.

2. The process according to claim 1 wherein the dispersion stabilizer is at least one compound selected from the group consisting of cellulose acetate, cellulose propionate, cellulose butyrate, cellulose acetate butyrate, cellulose acetate phthalate, ethyl cellulose, ethyl hydroxyethyl cellulose and benzyl cellulose.

3. The process according to claim 1 wherein the dispersion stabilizer is at least one compound selected from the group consisting of cellulose acetate butyrate, cellulose acetate, ethyl cellulose and ethyl hydroxyethyl cellulose.

4. The process according to claim 3 wherein the dispersion stabilizer is cellulose acetate butyrate and/or ethyl cellulose containing from 43 to 46% by weight of ethoxy groups.

5. The process according to claim 4 wherein the dispersing medium is a mixture of the following:
(A) at least one compound selected from the group consisting of esters, ketones and alkyl halides and
(B) an aromatic hydrocarbon and/or a halogenated aromatic hydrocarbon.

6. The process according to claim 5 wherein the dispersion stabilizer is cellulose acetate butyrate and the dispersion medium is a mixture of:
(A) at least one compound selected from the group consisting of esters of aliphatic carbonic acids of from 1 to 8 carbon atoms with alkanols or alkoxy alkanols each of from 1 to 8 carbon atoms and
(B) an aromatic hydrocarbon and/or a halogenated aromatic hydrocarbon.

7. The process according to claim 3 wherein the dispersion stabilizer is ethyl hydroxyethyl cellulose.

8. The process according to claim 7 wherein the dispersing medium is a saturated aliphatic hydrocarbon or a mixture of a saturated aliphatic hydrocarbon and another compound.

9. The process according to claim 8 wherein the saturated aliphatic hydrocarbon is a compound of a boiling point of from 35° to 400° C.

10. The process according to claim 9 wherein the saturated aliphatic hydrocarbon is a compound of a boiling point of from 35° to 180° C.

11. The process according to claim 10 wherein the saturated aliphatic hydrocarbon of a boiling point of from 35° to 180° C. is at least one compound selected from the group consisting of n-hexane, n-heptane n-octane.

12. The process according to claim 3 wherein the dispersion stabilizer is ethyl cellulose containing from 47 to 50% by weight of ethoxy groups.

13. The process according to claim 12 wherein the dispersing medium is a cycloaliphatic compound or a mixture of a cycloaliphatic compound and another compound.

14. The proces according to claim 13 wherein the cycloaliphatic compound is at least one compound selected from the group consisting of compounds of from 5 to 10 carbon atoms.

15. The process according to claim 14 wherein the cycloaliphatic compound is at least one compound selected from the group consisting of cyclohexane, methyl cyclohexane, cyclooctane, and decalin.

16. The process according to claim 15 wherein the cycloaliphatic compound is cyclohexane.

17. The process according to claim 1 wherein the compound of the formula I is at least one compound selected from the group consisting of salts of dialkylaminoethyl methacrylates and mineral acids, and quarternary ammonium salts of dialkylaminoethyl methacrylates with alkyl halides or dialkyl sulfates.

18. The process according to claim 17 wherein the compound of the formula I is $\beta$-methacryloyloxyethyl trimethylammonium chloride.

* * * * *